Aug. 11, 1959     O. T. McILVAINE     2,899,659
PHOTOCELLS
Filed Dec. 16, 1953
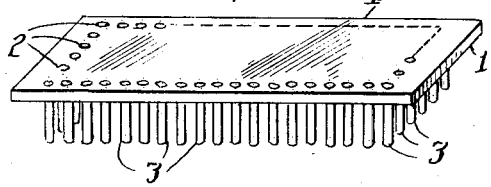
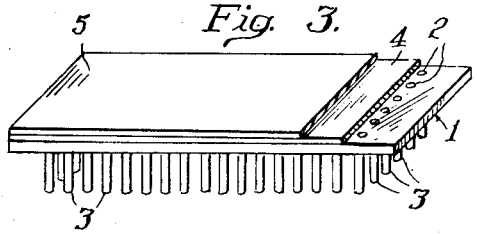
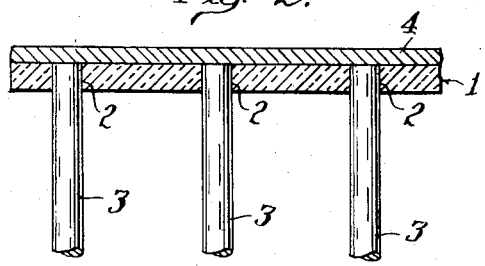
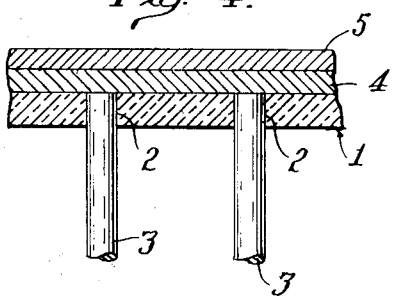
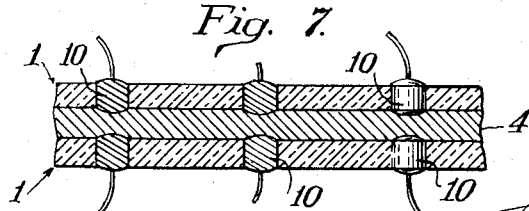
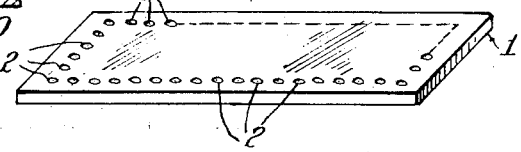
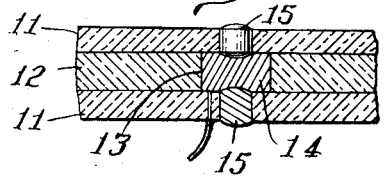
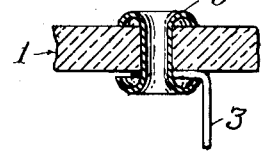
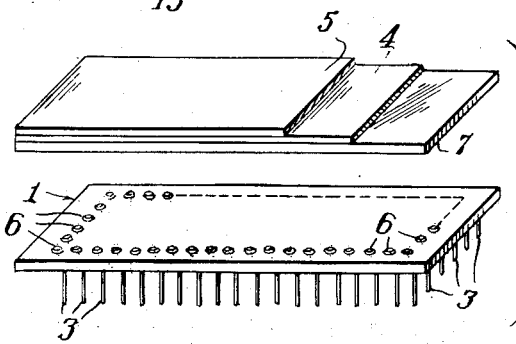
INVENTOR
Oran T. McIlvaine
BY
ATTORNEY

United States Patent Office 2,899,659
Patented Aug. 11, 1959

2,899,659

PHOTOCELLS

Oran T. McIlvaine, St. Charles, Ill.

Application December 16, 1953, Serial No. 398,512

7 Claims. (Cl. 338—17)

This application is a continuation-in-part of my prior application for Photocells, Serial No. 362,450, filed June 18, 1953, now Patent No. 2,809,134, which in turn was a continuation-in-part of my earlier application, Serial No. 275,435, filed March 7, 1952, now Patent No. 2,654,-819, granted October 6, 1953.

This invention relates to improvements in photocells and more particularly to photo-sensitive or photo-conductive cells constructed in multiple assembly, of the general type and for the purpose described in my Patent No. 2,516,784, granted July 25, 1950.

Many computors, calculators, and other machines, utilize a large number of cell elements, which requirement has increased appreciably the size of the machine because of the large number of individual cells usually provided therefor with the electronic tubes and other mechanism that is usually made necessary where individual cells are employed.

One object of this invention is to improve the process of making photocells of this character, to produce cells of multiple assembly which can be used in large machines with individual cell elements of minute size, and which cell elements are all combined in one unit, such as a composite sheet, to facilitate manufacture and installation.

A further object of the invention is to improve the construction of photo-conductive cells and of cell elements, to enable these to be installed in limited space where large cells of the character employed heretofore cannot be used, while securing an accurate photo-conductive action in response to light falling on the cell or cell element.

These objects may be accomplished according to certain embodiments of the invention by constructing the photocells in multiple assembly, as for instance in a composite sheet which has individual cell elements spaced over substantially the entire area of the sheet for electrical connection therewith, and suitably sensitized to respond to light falling thereon, producing a photo-conductive action between spaced parts of the sheet or between adjacent wires or other elements therein. The conductor wires may be secured directly in the sheet of insulating material, projecting out of a side thereof, by means of holes through the sheet, or sensitized elements may be mounted in the holes for electrical connection individually to the desired portion of the machine.

These individual elements or wires can be sensitized in the usual way to form a multiplicity of minute photocells, transistors, or other light responsive devices, or electrical elements, which will produce an electrical action directly between spaced portions or members on the sheet. Any suitable sheet of insulating material may be used for the purpose, such as glass, mica, or the like, perforated substantially over the entire area thereof or over a desired extent, with the perforations spaced sufficiently close together and sufficiently minute to accommodate the individual elements provided in the sheet.

These individual elements may be in the form of photocells, transistors, or the like, and formed by the introduction of the end of a conductor wire, a pellet, or the like, in each of the perforations. These elements are then sensitized and coated to form a multiple assembly of conducting elements that will respond to the desired actions of light or other physical functions.

Certain embodiments of the invention are illustrated in the accompanying drawings, in which:

Fig. 1 is a perspective view of a sheet of insulating material showing perforations over the area thereof, with the ends of wires secured in the perforations of the sheet;

Fig. 2 is a cross section therethrough;

Fig. 3 is a similar view showing the sheet so formed and with superposed layers thereon;

Fig. 4 is a cross section therethrough;

Fig. 5 is a disassembled perspective view showing a similar sheet of insulating material and a separate sheet bearing additional films thereon;

Fig. 6 is a perspective view showing a multiple transistor sheet;

Fig. 6a is a cross section through a modified form;

Fig. 7 is a cross section through another modified form;

Fig. 8 is a cross section showing a further modification.

Referring to the form of the invention shown in Figs. 1 and 2, I have provided a composite assembly using a base sheet of material designated generally by the numeral 1, which may be made in any suitable shape and size as desired, according to the use thereof and the space available for assembly of the device in the machine or other place where it is to be used. This is shown in the form of a sheet, but any suitable structure that has sufficient area to accommodate a multiplicity of individual elements may be used for the purpose, whether flat, curved, or of other shape. The base 1 may be of any suitable insulating material, such as glass, mica, or other substances suitable for that purpose.

The base sheet 1 is provided with a multiplicity of holes in or through the body thereof, generally designated at 2, and which holes preferably extend over substantially the entire area of the sheet, as indicated generally in Fig. 1. Conductor wires 3 are shown as extending into the holes 2 and secured therein as by soldering or otherwise. This forms a sheet with a multiple assembly of elements that may be mounted very close together, but separated and insulated from each other by the body of the sheet 1. This assembly is then covered by a semiconductor which is deposited thereover and forms a film or coating over the entire area of the sheet 1 and over the exposed ends of the wire 3, as indicated generally at 4 in Figs. 1 and 2. Any of the known or usual materials for this purpose may be employed, such as lead sulfide, germanium, thorium, silicon, etc. The semiconductor can be evaporated, flowed on in liquid bath, or chemically deposited in the manner described more in detail in my application Serial No. 362,450, referred to above.

If desired, the surface may be provided with a protective coating of a suitable covering material, such as plastic or varnish, which should be transparent, although this protective material is not necessary and may be omitted if desired.

A circuit is completed when a light beam strikes the spot between any two of the wires 3, closing a circuit thereby in the usual way. A multiple assembly of the light responsive elements may be activated according to the area of the light falling on the exposed upper surface of the device, generally indicated in Fig. 1.

The photo-conductive device shown in Figs. 3 and 4 uses the same base 1, as described above, having conductor wires 3 secured therein in the same manner and with a photo-conductive film or coating 4 over the outer surface of the base 1 and over the exposed ends of the wires 3. However, in this form a metal film 5 of suitable transparent conducting material is deposited over the semiconductor 4 so as to form an additional film over the sheet or base 1. This transparent metal film may be applied by evaporation, sputtering, or chemical deposition, or any other suitable manner, and forms a coating over the entire surface of the sheet 1, or at least the portion thereof that has the conductive elements mounted therein. This metal film 5 forms one of the electrical conductors and coacts with the individual wires 3 to close a circuit therebetween whenever a spot of light falls on the metal film opposite the end of a wire 3. Thus, a beam of light passing over the film 5 will energize each wire 3 successively, each wire 3 forming an individual photocell in cooperation with the film 5.

If desired, these parts may be provided in separate sheets, the base sheet 1 having the wires 3 connected with rivets 6 extending through the sheet 1 with the individual wires 3 secured, respectively, to the rivet 6. A separate sheet 7 of insulating material, such as mica, glass, or the like, is used to support and hold the photoconductive material, having a coating 4 thereon of semiconductor material, as described above, and with a separate superposed coating 5 formed as a metal film, which also has been described above. When the photocell sheet 7 is thus made, it may be laid on the base sheet 1 and connected therewith in any suitable manner, establishing the photo-actions between the metal film 5 and the rivets 6 as beams of light fall thereon, traveling over the individual elements either singly or in multiple of the entire assembly. This has the advantage that the photocell sheet 7 can be changed easily without the necessity for disconnection of all of the wires. A small condenser effect is provided between each individual rivet 6 and the semiconductor 4, due to the capacity of the mica sheet 7, but that can be eliminated, if desired, by using rivets also in the sheet 7 which will contact the base sheet 1.

The invention may be applied also a transistor assembly, as shown in Figs. 6 and 7. The insulating sheet 1 is provided with a multiplicity of small holes over substantially the entire area thereof, as indicated at 2 in Fig. 6. A semiconductor film 4, of the character described above, may be applied over the area of the sheet 1.

For contact type of transistors, wires are used in the holes of the insulating sheet or sheets, as described above. For junction type an acceptor or donor element from the materials of the third group of the periodic arrangement of the elements may be used, such as gallium, indium, and the like, or the donor element can be selected from the fifth group of the periodic arrangements of the elements, such as arsenic, antimony, bismuth, etc. Such acceptor or donor element is placed in each of the individual holes, as designated generally at 10 in Fig. 7, and may be connected with lead wires for electrical connections.

A second sheet of base material 1 with holes and donor elements, identical with the sheet described above, is placed on top of the semiconductor layer 4. Contact is then made by means of wires soldered to the donor elements or by contact from a second plate having metal contacts, as described above.

This forms a finished multiple cell or triode board, with the two insulating sheets having holes on each side filled with donor elements, and with a film of semiconductor therebetween. The semiconductor film can be applied in any suitable manner thereto, as described above, either evaporated or chemically deposited on one sheet, or the material in a powdered form can be applied over one sheet and then, when the two sheets are thus assembled, the entire unit can be placed in a furnace and the semiconductor element flowed between the two sheets. In that event, the donor elements should be added to the holes after thus applying the semiconductor, and they should be heated in a furnace to a temperature slightly higher than the melting point thereof, which will cause the donor elements to diffuse into the semiconductor element, substantially as indicated in Fig. 7, to provide a junction in the semiconductor. A pellet of donor metal of the character described may be used in each hole and diffused into the semiconductor. Additional layers of semiconductor materials may be used between the base sheets, thereby making tetrodes, pentodes, etc., as well as triodes.

If it is desired to operate the transistor directly by light, it is only necessary to scan the spot of light over the holes on one or the other side of the sheet. This gives amplified effects the same as if a photocell should be connected to a triode or pentode for additional amplification.

It is also possible to prepare the device with the semiconductor divided into small sections rather than forming a complete sheet between a pair of spaced insulating sheets or applied to a face of one such insulating sheet. This is accomplished by the modification shown in Fig. 8, as an example, which is illusrated with a pair of insulating sheets having the semiconductor therebetween. The insulating sheets are designated generally at 11 with a sheet 12 therebetween which is also formed of insulating material of the character described above or of other suitable material. An enlarged opening 13 in the sheet 12 may be filled with a section of semiconductor material, designated at 14, as described in position to register with the holes provided in the opposed insulating sheets 11. The holes in the latter are then filled with suitable donor or acceptor material, as indicated at 15, which is then fused into the base semiconductor material 14, as described. Connecting wires can be joined by soldering or otherwise to the donor or acceptor elements 15, and a connector wire should also be joined to the semiconductor element 14, which may be done through a hole provided in one of the insulator sheets 11.

It is also possible to provide the semiconductor elements 14 spaced from each other by evaporating the semiconductor material through a screen which will separate this material into individual elements as it is applied to one of the insulating sheets 11 on the face of the latter in position for juncture with the donor material 15 provided in the openings in said insulator sheet. If evaporation of this semiconductor material is not used and the chemical deposition is used, the screen could be a non-conductor so that after deposition it can be removed or left in place if desired. If the material is put on in a powder form or flowed on in a furnace, as described above, the intermediate insulating sheet is punched with holes larger than the side sheets, as described, to register with them. In that event, the side sheets are applied after the semiconductor material has filled the enlarged holes of the intermediate sheet and the operation completed, as described.

While the invention has been illustrated and described in certain embodiments, it is recognized that variations and changes may be made therein without departing from the invention as defined in the claims.

I claim:

1. A semiconductor assembly comprising a sheet of insulating material having holes therein, a second sheet of insulating material superposed over the first mentioned sheet and having holes of the respective sheets therein, conductor elements arranged in the holes in opposed and registering relation with each other, and a coating of semiconductor material interposed between the sheets and between the elements therein.

2. A semiconductor assembly comprising a sheet of insulating material having holes therein, a second sheet of insulating material superposed over the first mentioned sheet and having holes of the respective sheets therein, conductor elements arranged in the holes in opposed and registering relation with each other, and a coating of semiconductor material interposed between the sheets and between the elements therein, said elements being diffused into the semiconductor coating.

3. A photocell assembly comprising a sheet of insulating material having holes therein, a second sheet of insulating material superposed over the first-mentioned sheet and having holes therein, conductor elements arranged in the holes of the respective sheets in opposed and registering relation with each other, and a coating of photoconductive material interposed between the sheets and between the elements therein.

4. A photocell assembly comprising a sheet of insulating material having holes therein, a second sheet of insulating material superposed over the first-mentioned sheet and having holes therein, conductor elements arranged in the holes of the respective sheets in opposed and registering relation with each other, and a coating of photoconductive material therein, said elements being diffused into the photoconductive coating.

5. A light-sensitive device, comprising a sheet of insulation having a plurality of discrete perforations through its thickness, a quantity of light-responsive material in each perforation, and electrode means in contact with the opposite faces of said sheet and with the said light-sensitive material.

6. A light-sensitive device of the variable conductivity photo-responsive kind, comprising a plastic sheet having a plurality of discrete perforations through its thickness, each of said perforations having a filling of a material which is substantially an electric non-conductor when unexposed to light but which varies its conductivity in accordance with light incident thereon, and conductive electrode means carried by the opposite faces of said plastic sheet for making contact with the material in each perforation and thereby to provide a light-responsive variably conductive path between said electrodes.

7. A light-sensitive device of the photoconductive kind, comprising a layer of insulation having a multiplicity of discrete cavities therein, a filling of photoconductive material in each cavity, first electrode means for making electric contact with the corresponding ends of the fillings in each cavity, and other electrode means for making electric contact with the opposite corresponding ends of the fillings in each cathode.

References Cited in the file of this patent

UNITED STATES PATENTS

| | | |
|---|---|---|
| 919,078 | Ribbe | Apr. 20, 1909 |
| 1,880,289 | Sukumlyn | Oct. 4, 1932 |
| 1,935,650 | McCreary | Nov. 21, 1933 |
| 2,674,677 | Anderson et al. | Apr. 6, 1954 |

FOREIGN PATENTS

| | | |
|---|---|---|
| 424,914 | Italy | Sept. 3, 1947 |